(No Model.) 3 Sheets—Sheet 1.

E. G. LATTA.
VELOCIPEDE.

No. 341,811. Patented May 11, 1886.

Witnesses:
Chas. J. Buckhut
Theo. L. Popp

Inventor:
E. G. Latta
By Wilhelm & Bonner
Attorneys.

(No Model.) 3 Sheets—Sheet 2.

E. G. LATTA.
VELOCIPEDE.

No. 341,811. Patented May 11, 1886.

Witnesses:
Chas. J. Buchheit
Theo. L. Popp

Inventor:
E. G. Latta
By Wilhelm Bonner
Attorneys.

(No Model.) 3 Sheets—Sheet 3.

E. G. LATTA.
VELOCIPEDE.

No. 341,811. Patented May 11, 1886.

Witnesses:
Chas. J. Buchheit
Theodore L. Popp

E. G. Latta Inventor.
By Wilhelm Bonner
Attorneys.

UNITED STATES PATENT OFFICE.

EMMIT G. LATTA, OF FRIENDSHIP, NEW YORK, ASSIGNOR OF ONE-THIRD TO ADRIAN C. LATTA, OF SAME PLACE.

VELOCIPEDE.

SPECIFICATION forming part of Letters Patent No. 341,811, dated May 11, 1886.

Application filed November 23, 1885. Serial No. 183,640. (No model.)

*To all whom it may concern:*

Be it known that I, EMMIT G. LATTA, of Friendship, in the county of Allegany and State of New York, have invented new and useful Improvements in Velocipedes, of which the following is a specification.

The object of this invention is to improve the construction of the wheel in such manner as to increase its strength, reduce its weight, lessen the cost of construction, and facilitate the attachment of the parts to each other.

My invention consists, to these ends, of the improvements which will be hereinafter fully set forth, and pointed out in the claims.

Figure 1:
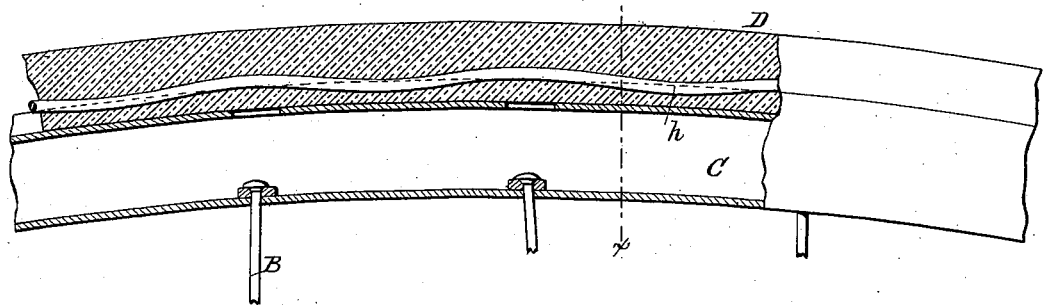
Figure 2:
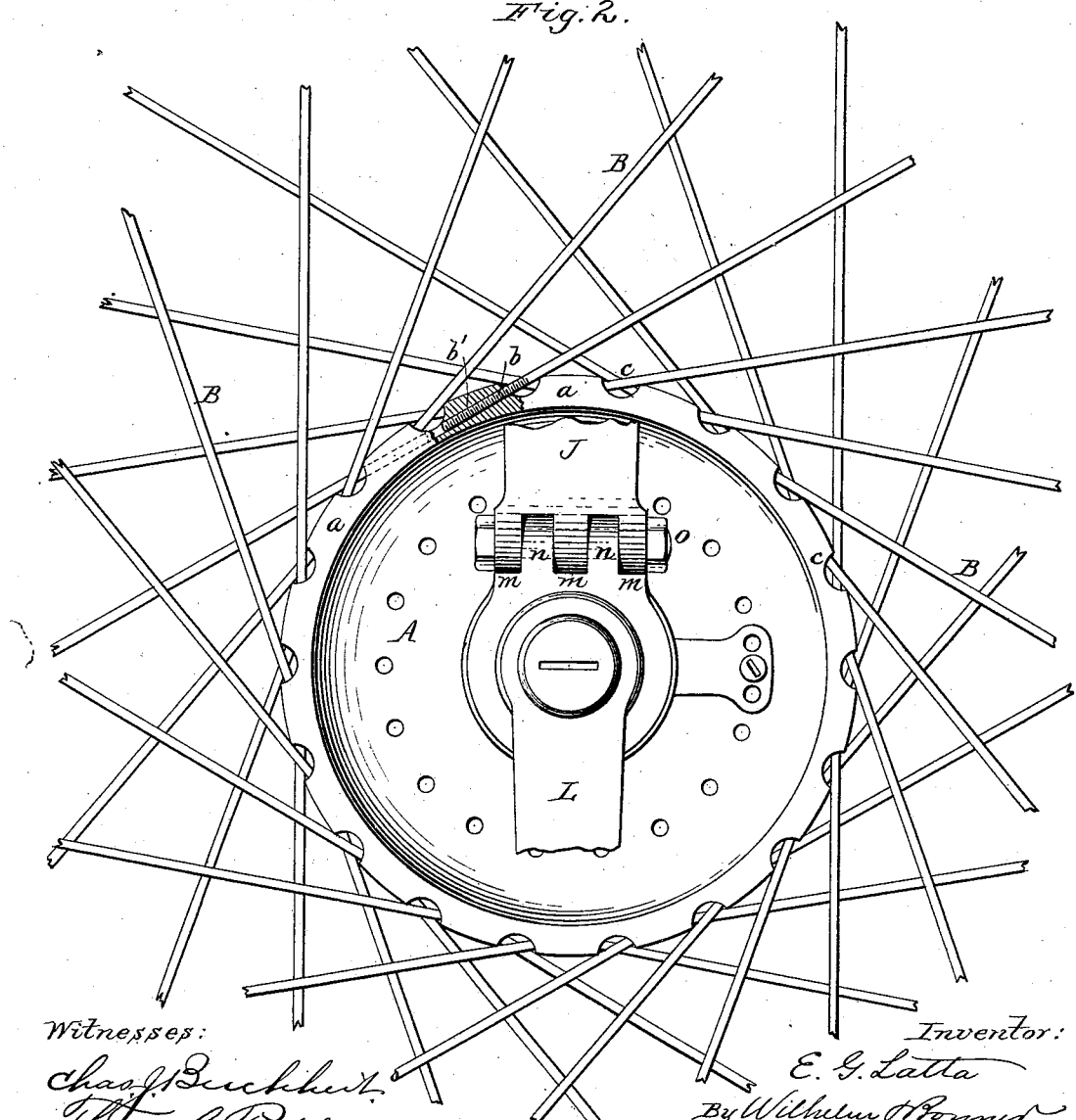
Figure 3:
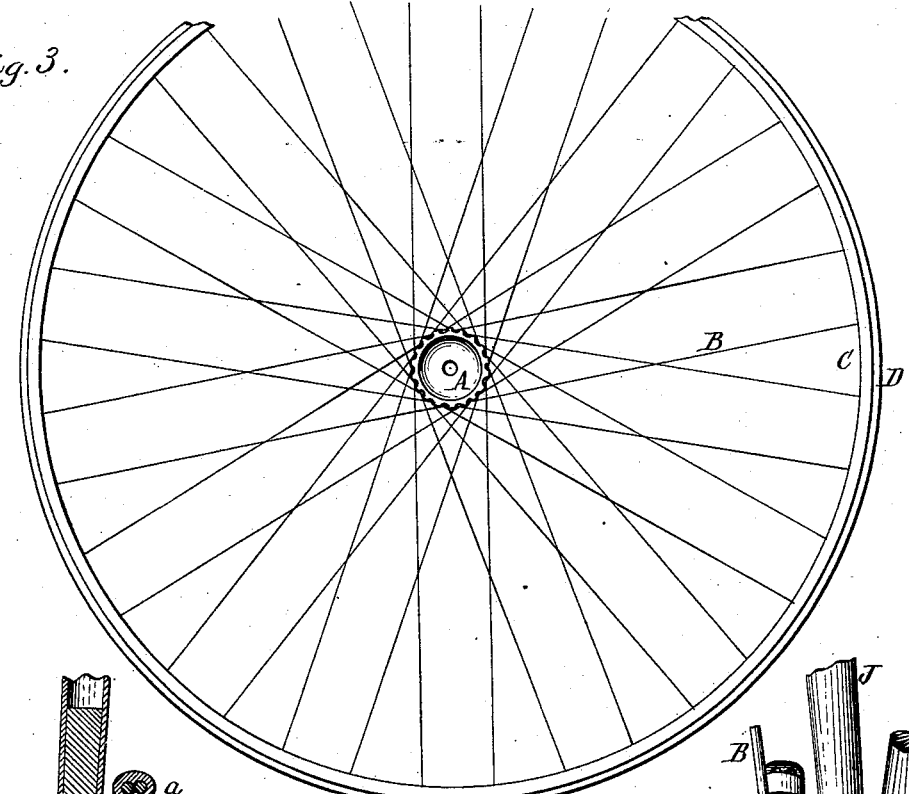
Figure 4:
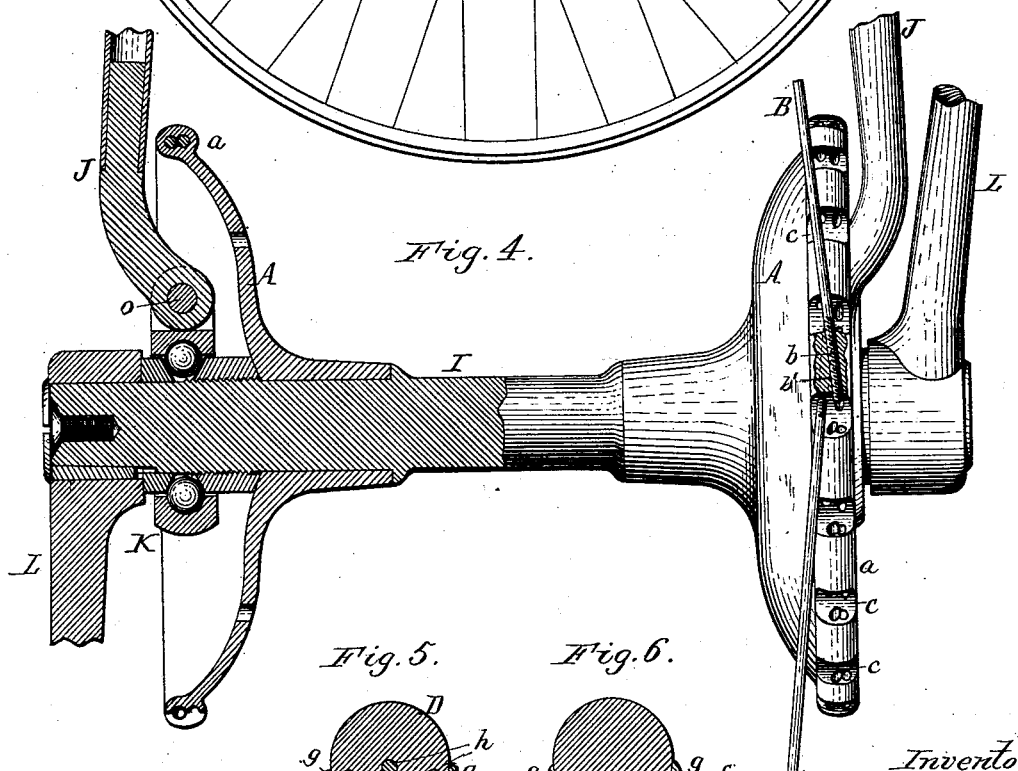
Figure 5:
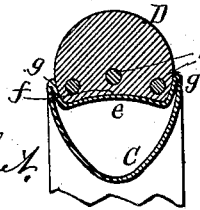
Figure 6:
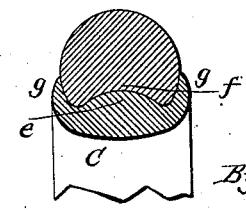
Figure 7:
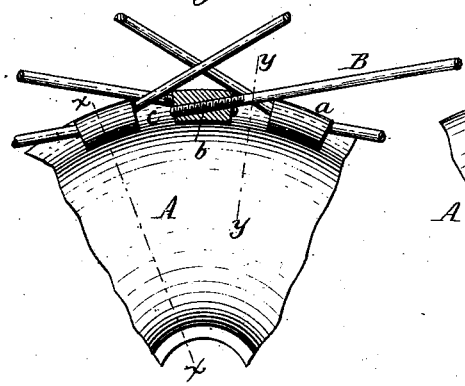
Figure 8:
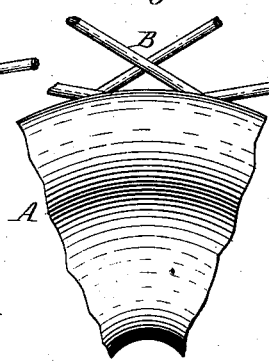
Figure 9:
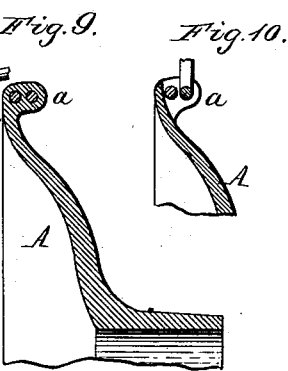
Figure 10:
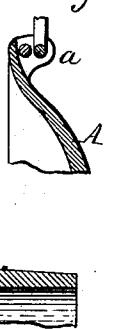
Figure 11:
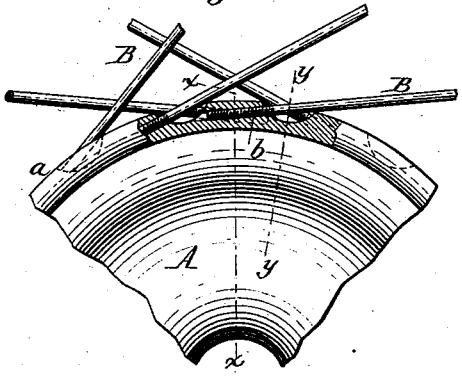
Figures 12, 13:
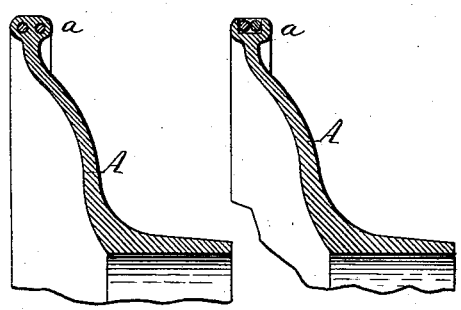
Figure 14:
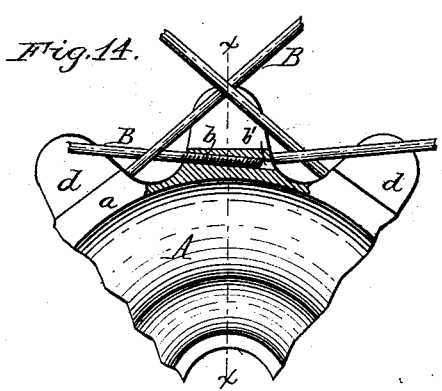
Figure 15:
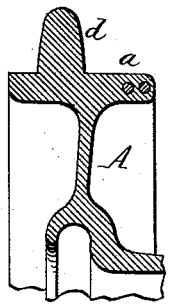
Figure 16:
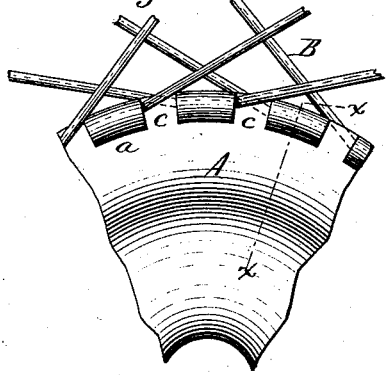
Figure 17:

In the accompanying drawings, consisting of three sheets, Figure 1 is a longitudinal sectional elevation of a portion of the rim. Fig. 2 is a side elevation, partly in section, of the central portion of the wheel, showing the spokes on one side only. Fig. 3 is a fragmentary side elevation of the wheel on a reduced scale. Fig. 4 is a partly-sectional elevation of the central portion of the wheel at right angles to Fig. 2. Fig. 5 is a cross-section of the rim in line $x$ $x$, Fig. 1. Fig. 6 is a cross-section of the rim, showing a modified construction of the same. Fig. 7 is a fragmentary side elevation of the hub-flange, illustrating a slightly-modified attachment of the spokes thereto. Fig. 8 is a similar elevation showing the opposite side of the hub-flange. Figs. 9 and 10 are cross-sections in lines $x$ $x$ and $y$ $y$, Fig. 7, respectively. Fig. 11 is a fragmentary side elevation of the hub-flange, showing a slightly-modified construction thereof. Figs. 12 and 13 are cross-sections in lines $x$ $x$ and $y$ $y$, Fig. 11, respectively. Fig. 14 is a fragmentary sectional side elevation of another modified construction of the hub-flange. Fig. 15 is a cross-section in line $x$ $x$, Fig. 14. Fig. 16 is a fragmentary side elevation showing a modified construction of the hub-flange. Fig. 17 is a cross-section in line $x$ $x$, Fig. 16.

Like letters of reference refer to like parts in the several figures.

A represents the hub-flange, secured to the axle in any suitable manner, and provided at its outer edge with a marginal rim or bead, $a$, to which the inner ends of the spokes B are attached.

C represents the rim of the wheel, preferably made hollow, and D is the rubber tire, attached to the outer side of the rim.

The hub-flanges A are preferably made of steel by drop-forging. The spokes B are headed at their outer ends, and provided at their inner ends with screw-threads $b$, by which they are secured in screw-threaded openings $b'$, formed in the marginal bead $a$ of the hub-flanges. This bead is cut away at intervals to form recesses or notches $c$, which facilitate the attachment of the spokes to the hub, and at the same time reduce the weight of the hub-flanges. The spokes are arranged tangentially, or nearly so, so that their inner ends, which are attached to the hub-flange, are arranged nearly in line with the bead at the points at which the spokes are attached to the bead. By this arrangement of the spokes the inner ends of the spokes are seated in the bead practically in the direction in which the bead extends around the hub-flange instead of at a radial line, as was formerly the case, whereby the spokes obtain a suitable bearing or holding surface in the bead lengthwise of the same, and without necessitating the formation of a thick or deep bead around the hub-flange, thus materially reducing the weight of the hub-flange without jeopardizing the strength and durability of the fastening. The cost and weight of screw-nuts at the ends of the spokes are also avoided, and the whole construction forms a very rigid wheel, which is easily repaired, and less expensive than a wheel of the same weight of the kinds heretofore known. Owing to the distance between the two hub-flanges, the spokes are screwed into the beads at an angle to the plane of the hub-flange, as represented in Fig. 4. The ends of the inner row of spokes pass under the ends of the outer row of spokes, which permits the bead to be made narrower than if the inner spokes did not pass under the outer spokes.

The direction or position which the spokes assume with reference to the hub-flange may vary from a true tangent in wheels of different diameters; but in all cases they will be nearly tangent to the hub-flange and enter the bead in a straight line from the rim. The spokes passing one way cross those passing the other way from four to nine times, in accordance with the size of the hub and the number of spokes used in large wheels; but in the case of smaller wheels with less than forty spokes they cross from two to four times. The spokes may be secured together where they cross each other by soldering or otherwise, if desired, and the ends of the spokes may be upset, if it is desired to increase their strength.

The notches in the beads facilitate drilling of the holes in which the inner ends of the spokes are secured; but they are not indispensable. I prefer, however, to employ them, for the reason that they facilitate the attachment of the parts together and reduce the weight of the hub-flanges. These notches may be made of any desired form or size, and may be formed across the outer face of the bead, as represented in Figs. 2, 4, 14, and 15; or they may be formed on one side of the bead and hub-flange only, as represented in Figs. 7, 8, 9, and 10; or they may be formed in the face of the bead, as represented in Figs. 11, 12, and 13; or they may be formed on both sides of the bead and on opposite sides of the hub-flange, as represented in Figs. 16 and 17.

The holes for the spokes may be drilled clear through the bead; but I prefer to leave the inner recessed face of the hub smooth, as shown.

The construction represented in Figs. 11, 12, and 13, in which the notches are formed in the face of the bead, produces a very neat hub, as both sides of the bead are smooth, but is somewhat more difficult of construction than the construction in which the notches are formed in the side of the bead.

In the construction represented in Figs. 14 and 15, $d$ represents the teeth or sprockets which engage with the drive-chain.

The notches formed in the bead of the hub-flange produce on the hub-flange projecting sockets, which alone are perforated for the reception of the inner ends of the spokes, while the hub-flange remains unperforated, the notches being large enough to accommodate those portions of the spokes which would lie within the hub-flange.

The rim C is constructed at its outer side with a recessed seat for the tire, having a convex or crowning bottom, $e$, and the tire D is made concave on its inner side, as shown at $f$, to fit the crowning seat $e$ of the rim. The tire is held against lateral displacement by the side flanges, $g$, formed on the rim C. This construction affords increased strength in the rim, and enables the same to better resist lateral strains or buckling without an increase of weight in the rim, while it permits the rubber tire to be made lighter than heretofore.

$h$ represents spring-wires, which are embedded in the rubber tire. These wires are crimped or bent to a serpentine form, as represented in Fig. 1, which permits the wires to stretch sufficiently to permit the tire to be placed into the seat of the rim, and to contract after the tire has been inserted in its seat, and thus secure the tire in its seat. These wires prevent the tire from rolling out of the seat when the wheel is in use, and if one of the wires should break, the others will of course retain the tire in place. The two ends of each wire are preferably secured before the rubber is molded, so that each wire constitutes a complete ring, and the rubber tire is preferably molded in an endless ring of the proper size to fit the wheel. The wavy or serpentine form of the wires prevents them from drawing in the tire if broken therein, so that if the wires should break at several different points they would not permit the tire to become detached from the wheel. This fastening is not affected by heat or cold, and effects a material saving in rubber. When a solid rim is used instead of a hollow rim, the convex or crowning seat is formed in the outer side of the rim, as represented in Fig. 6.

It is obvious that the tire may be secured in its seat by cement, in the usual manner, if desired.

I represents the axle; J the fork ends, K the bearing-boxes, and L the cranks.

$m$ represents three lugs formed on each fork end, and $n$ represents two lugs formed on each bearing-box, and engaging in the spaces between the fork-lugs $m$, as represented in Fig. 2.

$o$ represents a pivot-bolt passing horizontally through the lugs $m$ and $n$, and attaching the bearing-box to the fork ends. This construction of joint supports the fastening-bolt $o$ at two independent points, and forms a wider and more durable and secure joint than heretofore, permitting a smaller bolt to be used without sacrificing strength and security, and affords a closer and lighter build than the usual construction of joint.

I claim as my invention—

1. The combination, with a hub-flange constructed with an annular bead having tangential screw-threaded sockets arranged in pairs side by side, of straight spokes having screw-threaded inner ends secured in said openings in pairs side by side, substantially as set forth.

2. The combination, with the hub-flange, of projecting spoke-sockets perforated to receive the inner ends of the spokes, and separated by notches or recesses, through which the spokes pass, whereby the spoke-sockets only are required to be perforated for the reception of the spokes, while the hub-flange remains unperforated, substantially as set forth.

3. The combination, with the hub-flange, of projecting spoke sockets separated by notches or recesses, through which the spokes pass, each socket being provided with two openings for the reception of the inner ends of a pair of spokes, and tangential spokes arranged in pairs, with the inner ends of each pair secured in the openings of one socket, and passing from the socket to the rim in opposite directions, substantially as set forth.

4. The combination, with the hub-flange, of projecting sockets separated by notches or recesses, through which the spokes pass, each socket being provided with two openings arranged side by side for the reception of the inner ends of a pair of spokes, and tangential spokes arranged in two rows side by side, and provided with heads at their outer ends, and having their inner ends secured in said sockets, the spokes in one row extending from the hub to the rim in an opposite direction to the spokes in the other row, substantially as set forth.

5. The combination, with the rim, of a hub-flange having an annular bead constructed with two rows of tangential sockets arranged side by side, and tangential spokes provided with heads at their outer ends, and having their inner ends screw-threaded and secured in said sockets, with the inner ends of the inner row of spokes extending under the sockets of the outer row, substantially as set forth.

6. An elastic tire having a wavy or serpentine spring-wire molded into the tire, substantially as set forth.

7. The combination, with the rim having a recessed seat for the tire, of an elastic tire having a serpentine spring-wire molded into the tire, substantially as set forth.

Witness my hand this 18th day of November, 1885.

EMMIT G. LATTA.

Witnesses:
JNO. J. BONNER,
CARL F. GEYER.